United States Patent
Guo

(10) Patent No.: US 12,041,971 B2
(45) Date of Patent: Jul. 23, 2024

(54) ELECTRONIC CIGARETTE

(71) Applicant: PEGATRON CORPORATION, Taipei (TW)

(72) Inventor: Hong-Yi Guo, Taipei (TW)

(73) Assignee: PEGATRON CORPORATION, Taipei (TW)

(*) Notice: Subject to any disclaimer, the term of this patent is extended or adjusted under 35 U.S.C. 154(b) by 420 days.

(21) Appl. No.: 17/675,003

(22) Filed: Feb. 18, 2022

(65) Prior Publication Data

US 2022/0330616 A1 Oct. 20, 2022

(30) Foreign Application Priority Data

Apr. 20, 2021 (TW) .................................. 110114071

(51) Int. Cl.
| | | |
|---|---|---|
| *A24F 40/485* | (2020.01) | |
| *A24F 40/42* | (2020.01) | |
| *F16K 31/08* | (2006.01) | |
| *A24F 40/10* | (2020.01) | |

(52) U.S. Cl.
CPC ............ *A24F 40/485* (2020.01); *A24F 40/42* (2020.01); *F16K 31/084* (2013.01); *A24F 40/10* (2020.01)

(58) Field of Classification Search
None
See application file for complete search history.

(56) References Cited

U.S. PATENT DOCUMENTS

2018/0296778 A1* 10/2018 Hacker .................. A24F 40/50
2020/0297033 A1* 9/2020 Wang .................... A24F 40/485

FOREIGN PATENT DOCUMENTS

| CN | 111466618 A | 7/2020 |
| CN | 211379621 U | * 9/2020 |
| CN | 211379631 U | 9/2020 |
| EP | 3498115 A1 | 6/2019 |
| TW | M593161 U | 4/2020 |
| TW | 202041164 A | 11/2020 |
| WO | WO 2014047826 A1 | 4/2014 |
| WO | WO 2018133370 A1 | 7/2018 |

OTHER PUBLICATIONS

English machine translation of TENG, translated with Espacenet, CN-211379621-U, 2020 (Year: 2020).*
European Patent Office, Search Report issued on Aug. 30, 2022 for EP application No. 22161079.3.

* cited by examiner

Primary Examiner — Michael H. Wilson
Assistant Examiner — Michael T Fulton
(74) Attorney, Agent, or Firm — Li & Cai Intellectual Property (USA) Office

(57) ABSTRACT

An electronic cigarette is provided. The electronic cigarette includes a main body and a cigarette cartridge. The main body includes an accommodating slot and a magnetic valve. The magnetic valve movably protrudes from a bottom surface of the accommodating slot. The cigarette cartridge includes a joint surface and a magnetic body that is disposed on the joint surface. The cigarette cartridge is configured to be disposed in the accommodating slot. The magnetic body attracts the magnetic valve to move and protrude from the bottom surface of the accommodating slot, so that the magnetic body is connected to the magnetic valve, and an interval is formed between the cigarette cartridge and the main body.

10 Claims, 6 Drawing Sheets

ELECTRONIC CIGARETTE

CROSS-REFERENCE TO RELATED PATENT APPLICATION

This application claims the benefit of priority to Taiwan Patent Application No. 110114071, filed on Apr. 20, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic cigarette, and more particularly to an electronic cigarette that drives an atomizer with electric power and forms smoke by heating a liquid in an e-liquid container.

BACKGROUND OF THE DISCLOSURE

An electronic cigarette is an electronic product that imitates a cigarette, and the electronic cigarette can produce smoke by atomizing a smoke liquid for a user to inhale.

The electronic cigarette is equipped with a liquid storage tank (otherwise referred to as a vapor pad), and a tip of the vapor pad can be held and inhaled by the user. When the electronic cigarette is being used, air enters through an interval between a main body of the electronic cigarette and the vapor pad, and enters the mouth of the user through a central passage of the vapor pad.

When the interval between the main body of the electronic cigarette and the vapor pad is affected by a processing accuracy, a resistance experienced by the user during inhalation (or "draw resistance" for short) can be easily affected. A conventional method is to improve the processing accuracy, so that the interval between the main body of the electronic cigarette and the vapor pad can be within an acceptable tolerance range. In this way, the draw resistance of the electronic cigarette can be controlled and maintained within a certain range after mass production. The conventional method relies on the processing accuracy of a production machine to ensure that the interval meets its design specification. The disadvantage of the conventional method resides in that the production machine needs to achieve a certain degree of processing accuracy. In addition, the complexity of a manufacturing process is high and a certain degree of control accuracy is required, which result in an increase of manufacturing costs. Furthermore, the accuracy problem often causes an actual draw resistance to be inconsistent with a designed draw resistance.

SUMMARY OF THE DISCLOSURE

In response to the above-referenced technical inadequacies, the present disclosure provides an electronic cigarette that has a reduced manufacturing complexity, and a draw resistance of the manufactured electronic cigarette is consistent with an estimated draw resistance.

In one aspect, the present disclosure provides an electronic cigarette. The electronic cigarette includes a main body and a cigarette cartridge. The main body includes an accommodating slot and a magnetic valve. The magnetic valve movably protrudes from a bottom surface of the accommodating slot. The cigarette cartridge includes a joint surface and a magnetic body that is disposed on the joint surface, and configured to be disposed in the accommodating slot. The magnetic body attracts the magnetic valve to move and protrude from the bottom surface of the accommodating slot, so that the magnetic body is connected to the magnetic valve, and an interval is formed between the cigarette cartridge and the main body.

Therefore, in the electronic cigarette provided by the present disclosure, by virtue of "the magnetic body of the cigarette cartridge attracting the magnetic valve to move and protrude from the bottom surface of the accommodating slot, so that an interval is formed between the cigarette cartridge and the main body," the draw resistance of the electronic cigarette can be accurately controlled and be consistent with the estimated draw resistance.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
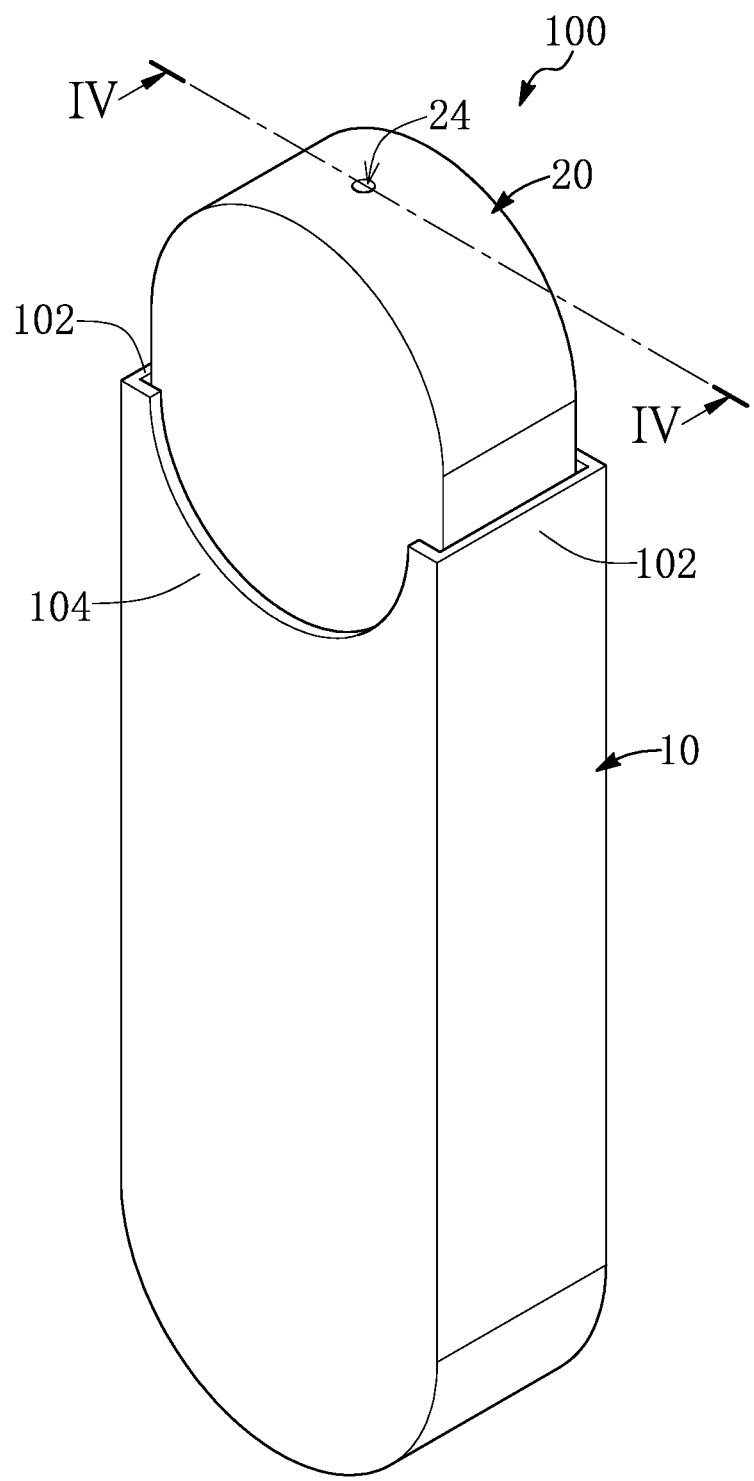
FIG. 1 is a schematic perspective view of an electronic cigarette according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure provides an electronic cigarette 100 that includes a main body 10 and a cigarette cartridge 20. The cigarette cartridge 20 is detachably disposed on the main body 10, and the main body 10 includes an accommodating slot 10S and a magnetic valve 11. An inside portion of the main body 10 can further have other components, such as a battery (not shown in the drawings) and a control circuit (not shown in the drawings), so as to control and supply power to the cigarette cartridge 20. An inside portion of the cigarette cartridge 20 can further have a smoke liquid container (not shown in the drawings) for storing a smoke liquid and an atomizer (not shown in the drawings). When the electronic cigarette 100 is being used, the electronic cigarette 100 is heated by the power of the main body 10, so that the smoke liquid in the cigarette cartridge 20 is atomized into gas by the atomizer. A center of the cigarette cartridge 20 has a smoke outlet channel 24 that travels from a bottom of the cigarette cartridge 20 to a top of the cigarette cartridge 20. The smoke outlet channel 24 in the present embodiment is exemplarily illustrated. In fact, the smoke outlet channel 24 passes through the atomizer and is in spatial communication with a smoke pipe of the smoke liquid container.

Figure 4:
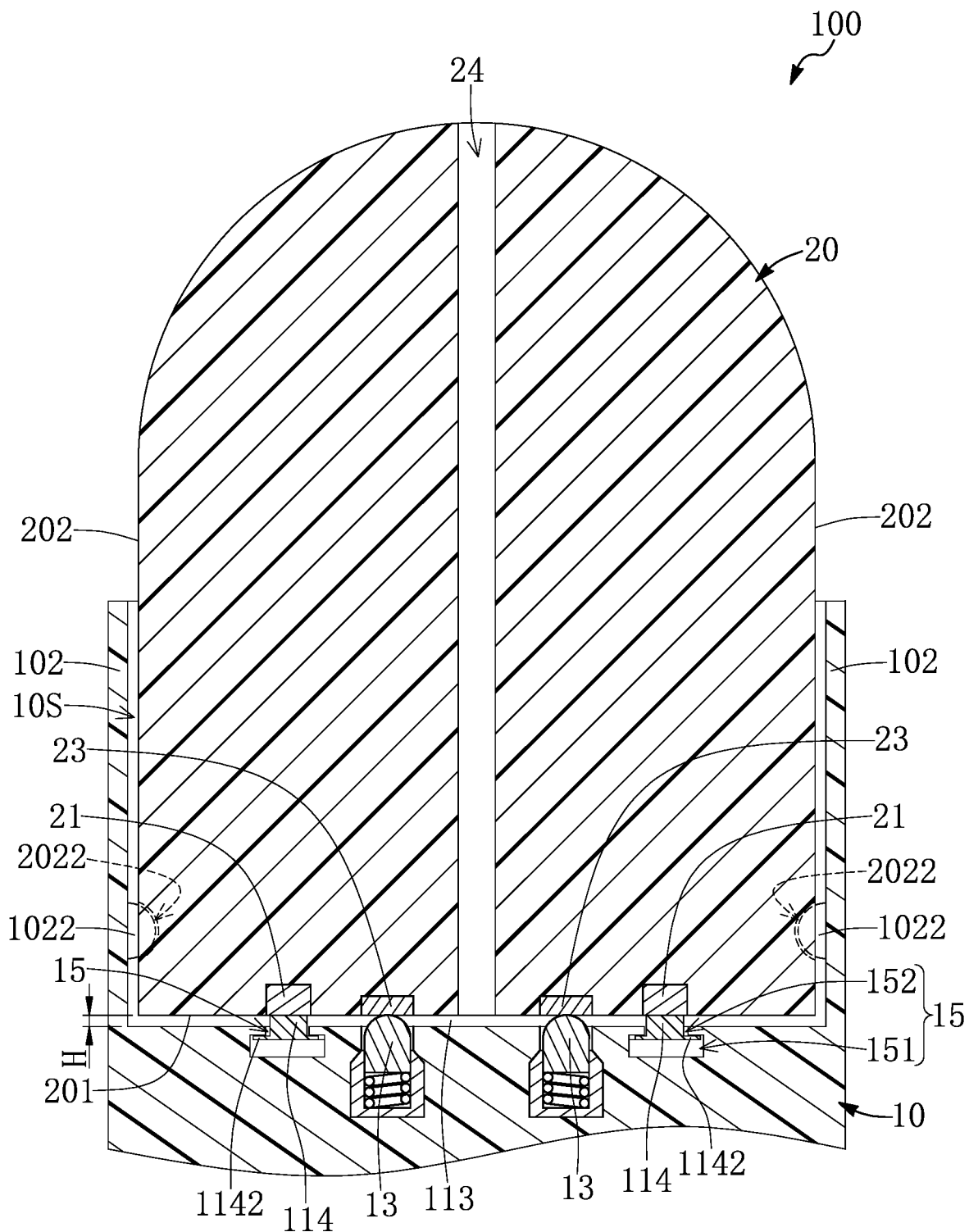
FIG. 4 is a schematic cross-sectional view taken along line IV-IV of FIG. 1.

The magnetic valve 11 can movably protrude from a bottom surface of the accommodating slot 10S. In addition, referring to FIG. 2, the cigarette cartridge 20 includes a joint surface 201 and a magnetic body 21 disposed on the joint surface 201, and the cigarette cartridge 20 can be disposed in the accommodating slot 10S. In the present embodiment, the magnetic body 21 of the cigarette cartridge 20 can attract the magnetic valve 11 to move and protrude from the bottom surface of the accommodating slot 10S, so that the magnetic body 21 is connected to the magnetic valve 11, and an interval H is formed between the cigarette cartridge 20 and the main body 10, as shown in FIG. 4. A draw resistance of the electronic cigarette 100 can thus be accurately controlled and be consistent with an estimated draw resistance.

In the present embodiment, the magnetic valve 11 can be a metal or a magnet (such as a powerful magnet made of neodymium iron boron), but the present disclosure is not limited thereto. Correspondingly, the magnetic body 21 can be a magnet (e.g., a powerful magnet made of neodymium iron boron) or a metal, but the present disclosure is not limited thereto. Or, the magnetic valve 11 and the magnetic body 21 can both be magnets, and magnetic poles thereof are opposite and attract each other. The following description describes the details of the magnetic valve 11 and the magnetic body 21 in a more specific manner.

The main body 10 has a partition wall 101, so as to separate the accommodating slot 10S and a plurality of accommodating spaces that accommodate other components. In other words, a top surface of the partition wall 101 is used as the bottom surface of the accommodating slot 10S. The partition wall 101 in the present embodiment can be in a rectangular shape. Correspondingly, the main body 10 has a pair of first side walls 102 and a pair of second side walls 104, and the first side walls 102 and the second side walls can be collectively referred to as side walls. The pair of first side walls 102 and the pair of second side walls 104 are connected to a periphery of the partition wall 101 to form the accommodating slot 10S. However, the present disclosure is not limited thereto. For example, the partition wall can be a wall in an oval shape, a cylindrical shape, or other shapes.

In the present embodiment, a bottom half of the cigarette cartridge 20 is in a cuboid shape, and has two first sides 202 and two second sides 204. The two first sides 202 are narrower than the two second sides 204. In addition, the magnetic body 21 in the present embodiment is in a rectangular shape. However, the present disclosure is not limited thereto. For example, the bottom half of the cigarette cartridge 20 can be in a cylindrical shape having an oval cross-section, a cylindrical shape, or other shapes. The shape of the partition wall 101 corresponds to the shape of the joint surface 201 of the cigarette cartridge 20. In addition, a side wall of the main body 10 may be ring-shaped and surround the partition wall. For example, the side wall can be in a cylindrical shape or an oval cylindrical shape, and a quantity of the side wall is one.

In the present embodiment, a positioning mechanism is formed between the pair of first side walls 102 and the cigarette cartridge 20, and includes at least one locking block 1022 and at least one locking groove 2022. Specifically, in the present embodiment, there are two locking block 1022 and two locking groove 2022. The two locking blocks 1022 are formed on the two first side walls 102 of the main body 10, respectively. The two locking grooves 2022 are formed on the two first sides 202 of the cigarette cartridge 20 that are opposite to each other, respectively. The locking blocks 1022 may be in a hemispherical shape, and the locking grooves 2022 may be in a hemispherical shape. Accordingly, after the cigarette cartridge 20 is installed in the main body 10, the positioning mechanism can allow the interval H to be formed between the bottom surface of the cigarette cartridge 20 and the bottom surface of the accommodating slot 10S (that is, the partition wall 101 of the main body 10). In other words, the positioning mechanism can prevent the cigarette cartridge 20 from being in close contact with the bottom surface of the accommodating slot 10S, which can affect airflow. However, the positioning mechanism in the present disclosure is not limited thereto. A quantity of the locking blocks 1022 of each of the first side walls 102 can be at least one. Correspondingly, a quantity of the locking grooves 2022 can be at least one. Or, positions of the locking blocks 1022 and the locking grooves 2022 can be interchanged. In another one of the embodiments, a protruding portion in a stepped shape can be formed at a periphery of the main body 10, so that a top edge of the side wall of the main body 10 can abut against the protruding portion, or the positioning mechanism can be formed between the cigarette cartridge 20 and the main body 10.

Figure 2:
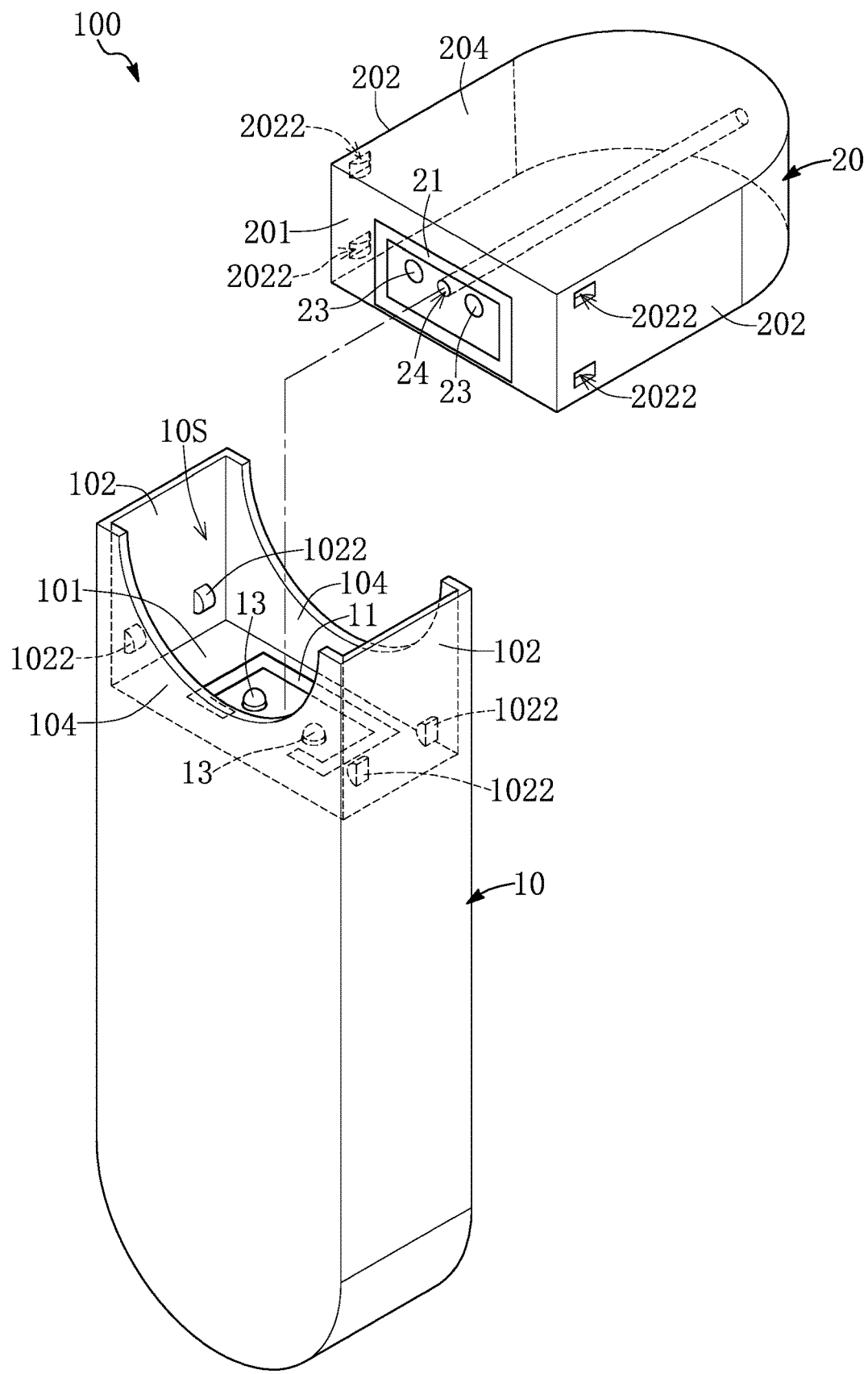
FIG. 2 is a schematic exploded view of the electronic cigarette according to the first embodiment of the present disclosure.

Referring to FIG. 1 and FIG. 2, in the present embodiment, the second side walls 104 of the main body 10 each have a grip groove in a semicircle shape, so that a user can easily hold the cigarette cartridge 20 to separate the cigarette cartridge 20 and the main body 10.

Referring to FIG. 2 and FIG. 4, the main body 10 also has a pair of conductive terminals 13 located in an inner side of magnetic valve 11. In other words, the pair of conductive terminals 13 are surrounded by the magnetic valve 11. Correspondingly, the cigarette cartridge 20 has a pair of electrodes 23, and the pair of electrodes 23 correspondingly contact the pair of conductive terminals 13. Preferably, the pair of conductive terminals 13 may be flexible terminals, such as a POGO pin including a plunger, a tube, and a spring, but the present disclosure is not limited thereto. For example, the pair of conductive terminals 13 can also be other elastic terminals. An electric power received by the pair of conductive terminals 13 can allow the atomizer located in the cigarette cartridge 20 (not shown in the drawings) to heat the smoke liquid.

Figure 3:
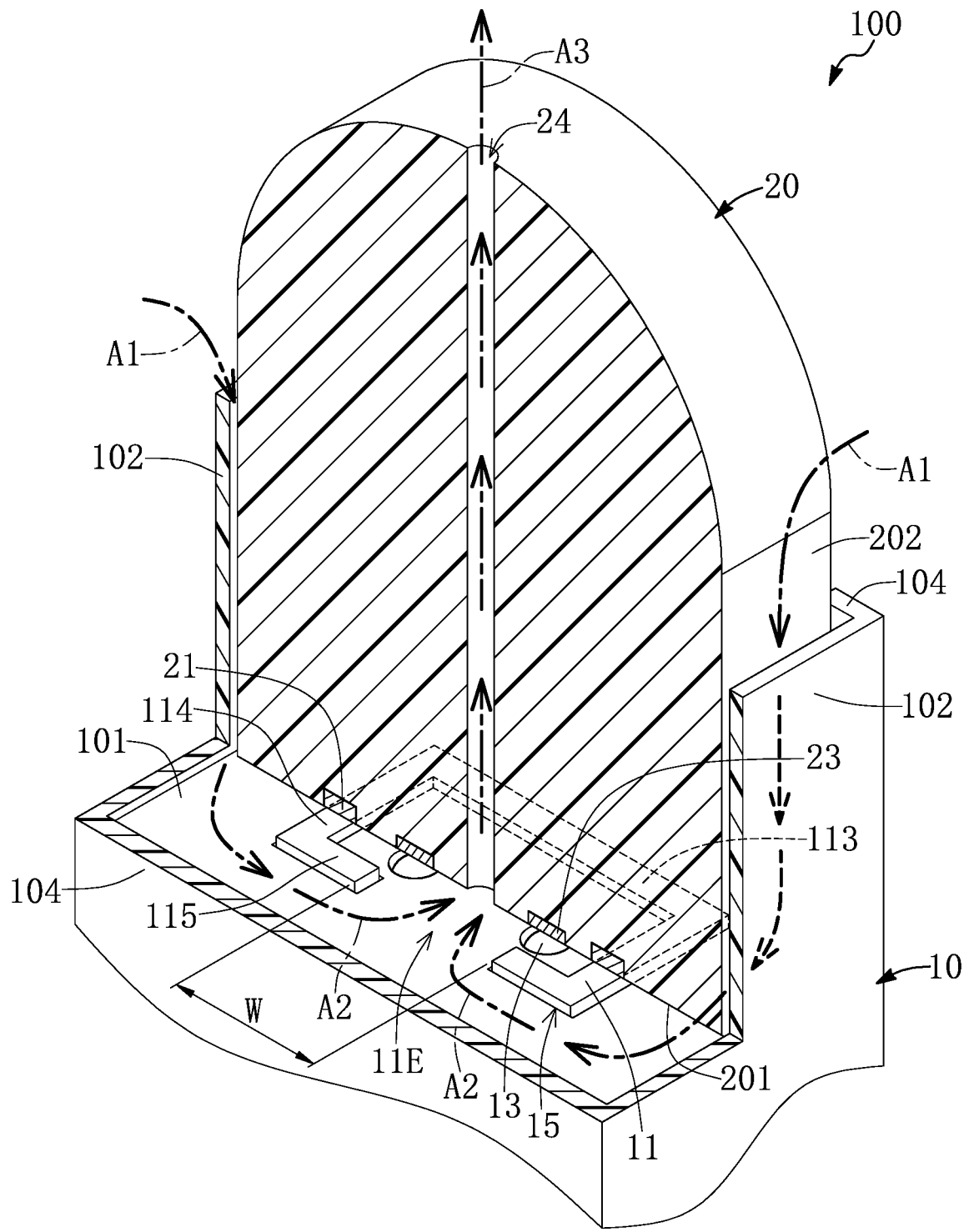
FIG. 3 is a partial cross-sectional view taken along a middle of a cigarette cartridge according to the present disclosure.

Referring to FIG. 3 and FIG. 4, when the magnetic valve 11 is attracted by the magnetic body 21 of the cigarette cartridge 20, a top end of the magnetic valve 11 abuts against the cigarette cartridge 20 and a valve port 11E is formed by the magnetic valve 11. An outer surface of the magnetic body 21 is preferably flush with the joint surface 201 of the cigarette cartridge 20. In other words, the outer surface of the magnetic body 21 is the same plane as the joint surface 201 of the cigarette cartridge 20. In the present embodiment, a width W of the valve port 11E and a height of the magnetic valve 11 that protrudes from the main body 10 can be adjusted through a design process. The height of the magnetic valve 11 may be the interval H between the cigarette cartridge 20 and the main body 10). Referring to FIG. 4, the interval H is configured to accurately control a resistance of an inflow of air, that is, an accuracy of the draw resistance. The above-mentioned structure in the present embodiment can replace a processing tolerance of the interval H between the main body and the cigarette cartridge of the electronic cigarette, and reduce a tolerance caused by a production machine and a manufacturing process, so as to ensure that the draw resistance of a product is consistent with the estimated draw resistance.

The magnetic valve 11 in the present embodiment is in a rectangular shape and has the valve port 11E. The valve port 11E may be a channel for air flow. Specifically, the magnetic valve 11 has a first retaining wall 113, two second retaining walls 114, and two third retaining walls 115. Two first ends of the two second retaining walls 114 are respectively connected to two ends of the first retaining walls 113, and two first ends of the two third retaining walls 115 are respectively connected to two second ends of the two second retaining walls 114. The valve port 11E is formed between two second ends of the two third retaining walls 115. Specifically, the two second ends of the two third retaining walls 115 are free ends. The free ends are not connected to each other, so as to form the valve port 11E therebetween. However, the present disclosure is not limited thereto. For example, the magnetic valve 11 can be in any semi-closed geometric shape, such as a C shape. Or, the magnetic valve 11 can be in a circular or polygonal shape with openings.

Referring to FIG. 3, when the electronic cigarette 100 is used by a user, an outside air flows through the intervals between the first side walls 102 and the main body 10 and between the second side wall 104 and the main body 10 to form a first airflow A1. Then, the first airflow A1 flows into the interval H between the cigarette cartridge 20 and the bottom surface of the accommodating slot 10S to form a second airflow A2. Since the second airflow A2 is limited by the shape of the magnetic valve 11, the second airflow A2 flows to the valve port 11E and then flows into the smoke outlet channel 24 of the cigarette cartridge 20, thereby forming a third airflow A3.

Referring to FIG. 4, the magnetic valve 11 in the present embodiment can movably protrude from the bottom surface of the accommodating slot 10S. Such a configuration has an advantage of easily controlling the top surface of the magnetic valve 11 to properly fit with the joint surface 201 of the cigarette cartridge 20. With respect to the magnetic valve 11 being floatable, a feasible implementation is exemplified as follows. The partition wall 101 of the main body 10 includes a limiting receiving groove 15 that is substantially in a T-shape. The magnetic valve 11 can be movably accommodated in the limiting receiving groove 15, and includes a lower portion 151 and an upper portion 152. The upper portion 152 is in spatial communication with the lower portion 151. A width of the upper portion 152 is smaller than a width of the lower portion 151. In order to prevent the magnetic valve 11 from separating from the main body 10, the magnetic valve 11 has a limiting portion 1142 movably disposed in the lower portion 151. A width of the limiting portion 1142 is greater than the width of the upper portion 152. Accordingly, the limiting portion 1142 of the magnetic valve 11 cannot leave the upper portion 152 of the limiting receiving groove 15.

Second Embodiment

Figure 5:
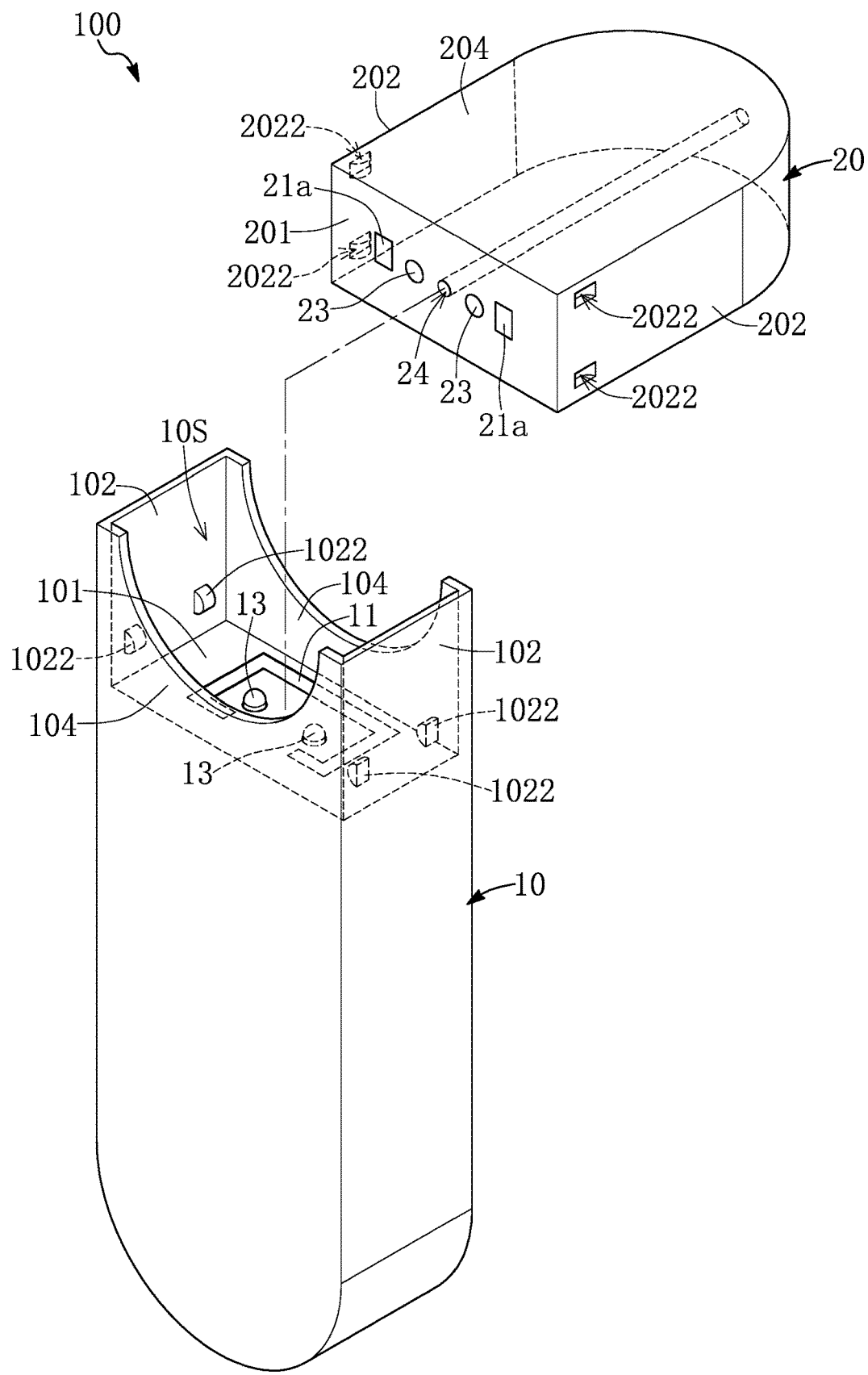
FIG. 5 is a schematic exploded view of the electronic cigarette according to a second embodiment of the present disclosure.

Referring to FIG. 5, the difference between the present embodiment and the above embodiment mainly resides in that the magnetic body of the cigarette cartridge 20 includes a pair of magnets 21a configured to attract to two sides of the magnetic valve 11, respectively. The bottom surfaces of the pair of magnets 21a is flush with the joint surface 201 of the cigarette cartridge 20. The pair of magnets 21a in the present embodiment are two rectangles, but a quantity and a shape of the magnets are not limited thereto. For example, the magnets can also be in a circular shape, and the quantity of the magnets can be more than two.

Third Embodiment

Figure 6:
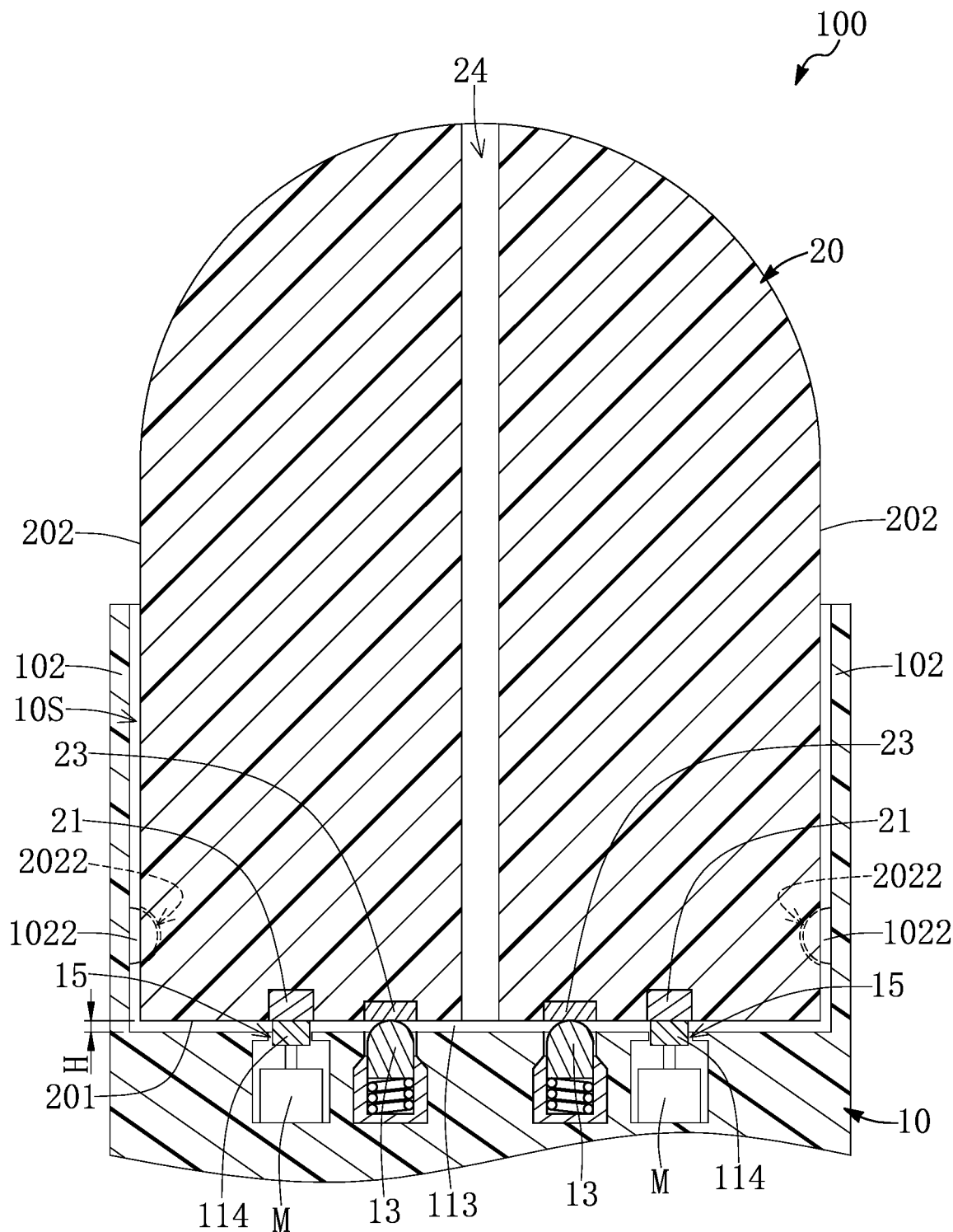
FIG. 6 is a schematic cross-sectional view of the electronic cigarette according to a third embodiment of the present disclosure.

Referring to FIG. 6, the difference between the present embodiment and the above embodiment mainly resides in that the electronic cigarette 100 can further include at least one motor M. The at least one motor M is disposed in the main body 10 and electrically connected to the magnetic valve 11. The at least one motor M can drive the magnetic valve 11 to move (e.g., push up), so that the magnetic valve 11 can protrude from the bottom surface of the accommodating slot 10S or fine-tune the height of the magnetic valve 11 that protrudes from the bottom surface of the accommodating slot 10S. The main body 10 includes the limiting receiving groove 15, and the magnetic valve 11 can be movably accommodated in the limiting receiving groove 15. The at least one motor M can be disposed under the magnetic valve 11 and accommodated in the limiting receiving groove 15. To ensure that a horizontal height of the magnetic valve 11 is uniform during ascension, a quantity of the motor M in the electronic cigarette 100 of the present embodiment can be two. The two motors M are disposed under the two second retaining walls 114 of the magnetic valve 11, and are configured to abut against the bottom surface of the magnetic valve 11, but the present disclosure is not limited thereto. For example, the quantity of the motor M can be at least one, and is disposed in other positions of the main body 10. Or, the motor M and the magnetic valve 11 can be connected to each other by a connection structure, so that the motor M drives the magnetic valve 11 to move through the connection structure.

The advantage of the present embodiment is that the electronic cigarette 100 can control the height of the magnetic valve 11 that protrudes from the bottom surface of the accommodating slot 10S by adjusting the at least one motor M, so as to fine-tune the interval H between the cigarette cartridge 20 and the main body 10 and thereby adjust the draw resistance. In other words, the user can adjust the draw resistance by adjusting a lifting height of the at least one motor M according to personal preference. When the at least one motor M further pushes up the magnetic valve 11, the interval H between the cigarette cartridge 20 and the main body 10 is increased, which can reduce the draw resistance. When the at least one motor M slightly reduces the height of the magnetic valve 11 that protrudes from the bottom surface of the accommodating slot 10S, the interval H between the cigarette cartridge 20 and the main body 10 is reduced, which can increase the draw resistance. Moreover, since the electronic cigarette 100 can control the height of the magnetic valve 11 that protrudes from the bottom surface of the accommodating slot 10S through the at least one motor M, the positioning mechanism can even be omitted.

In conclusion, in the electronic cigarette provided by the present disclosure, by virtue of "the magnetic body 21 of the cigarette cartridge 20 attracting the magnetic valve 11 to move and protrude from the bottom surface of the accommodating slot 10S, so that an interval is formed between the cigarette cartridge 20 and the main body 10," a draw resistance of the electronic cigarette 100 can be accurately controlled to be consistent with a draw resistance that is an estimated design, as shown in FIG. 4.

More specifically, when the magnetic valve 11 is attracted by the magnetic body 21 of the cigarette cartridge 20, the top end of the magnetic valve 11 abuts against the cigarette cartridge 20 and the valve port 11E is formed by the magnetic valve 11. In the present embodiment, the width W of the valve port 11E and the height of the magnetic valve 11 that protrudes from the main body 10 (that is, the interval H between the cigarette cartridge 20 and the main body 10) can be adjusted through a design process. The interval H is configured to accurately control an inflow of air (that is, an accuracy of the draw resistance).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic cigarette, comprising:
a main body comprising an accommodating slot and a magnetic valve, wherein the magnetic valve movably protrudes from a bottom surface of the accommodating slot; and
a cigarette cartridge comprising a joint surface and a magnetic body disposed on the joint surface, wherein the cigarette cartridge is configured to be disposed in the accommodating slot, the magnetic body attracts the magnetic valve to move and protrude from the bottom surface of the accommodating slot, so that the magnetic body is connected to the magnetic valve, and an interval is formed between the cigarette cartridge and the main body.

2. The electronic cigarette according to claim 1, wherein an outer surface of the magnetic body of the cigarette cartridge is flush with the joint surface of the cigarette cartridge.

3. The electronic cigarette according to claim 1, wherein the magnetic valve is in a semi-closed geometric shape.

4. The electronic cigarette according to claim 1, wherein the main body further comprises a limiting receiving groove, the magnetic valve is movably accommodated in the limiting receiving groove, the limiting receiving groove comprises a lower portion and an upper portion, the upper portion is in spatial communication with the lower portion, a width of the upper portion is smaller than a width of the lower portion, the magnetic valve further comprises a limiting portion, the limiting portion is movably disposed in the lower portion, and a width of the limiting portion is greater than the width of the upper portion.

5. The electronic cigarette according to claim 1, wherein the main body further comprises a pair of conductive terminals located in an inner side of the magnetic valve, the cigarette cartridge includes a pair of electrodes, and the pair of electrodes correspondingly contact the pair of conductive terminals.

6. The electronic cigarette according to claim 1, further comprising at least one motor disposed in the main body and electrically connected to the magnetic valve, wherein the at least one motor is configured to drive the magnetic valve to move.

7. The electronic cigarette according to claim 1, further comprising a positioning mechanism, wherein the main body comprises a partition wall and at least one side wall, the at least one side wall is connected to a periphery of the partition wall to form the accommodating slot, and the positioning mechanism is formed between the at least one side wall and the cigarette cartridge.

8. The electronic cigarette according to claim 7, wherein the positioning mechanism comprises at least one locking block and at least one locking groove, the at least one locking block is disposed on one of the cigarette cartridge and the at least one side wall, the at least one locking groove is disposed on another one of the cigarette cartridge and the at least one side wall, and the at least one locking block is engaged to the at least one locking groove.

9. The electronic cigarette according to claim 1, wherein, when the magnetic valve is connected to the magnetic body, a valve port is formed by the magnetic valve.

10. The electronic cigarette according to claim 9, wherein the magnetic valve comprises a first retaining wall, two second retaining walls, and two third retaining walls, two first ends of the two second retaining walls are respectively connected to two ends of the first retaining walls, two first ends of the two third retaining walls are respectively connected to two second ends of the two second retaining walls, and the valve port is formed between two second ends of the two third retaining walls.

* * * * *